T. C. HOLLNAGEL.
TRUCK.
APPLICATION FILED DEC. 6, 1918.

1,325,517.

Patented Dec. 23, 1919.
2 SHEETS—SHEET 1.

Inventor
Theodore C. Hollnagel
By Ursell, Keeney & French
Attorneys.

T. C. HOLLNAGEL.
TRUCK.
APPLICATION FILED DEC. 6, 1918.

1,325,517.

Patented Dec. 23, 1919.
2 SHEETS—SHEET 2.

Inventor
Theodore C. Hollnagel
By Yorsell, Kearny & French
Attorneys

UNITED STATES PATENT OFFICE.

THEODORE C. HOLLNAGEL, OF MILWAUKEE, WISCONSIN.

TRUCK.

1,325,517.   Specification of Letters Patent.   Patented Dec. 23, 1919.

Application filed December 6, 1918. Serial No. 265,540.

*To all whom it may concern:*

Be it known that I, THEODORE C. HOLLNAGEL, a citizen of the United States, and resident of Milwaukee, in the county of Milwaukee and State of Wisconsin, have invented new and useful Improvements in Trucks, of which the following is a description, reference being had to the accompanying drawings, which are a part of this specification.

The invention relates to trucks and more particularly to that type of motor truck in which the box is elevated at its front end to discharge the load and may be used for handling various kinds of bulk material.

The invention further consists in the several features hereinafter set forth and shown in the accompanying drawings, in which.

Figure 1:
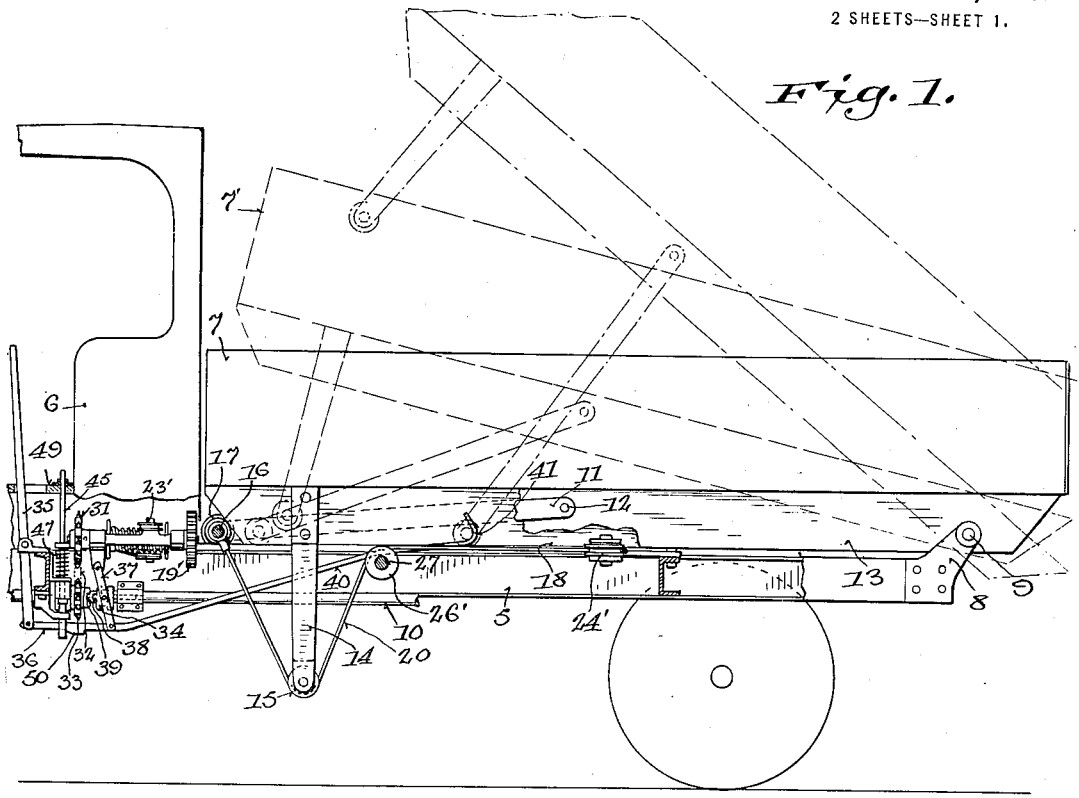
Figure 1 is a side view of the device, parts being broken away and parts being shown in section.
Figure 2:
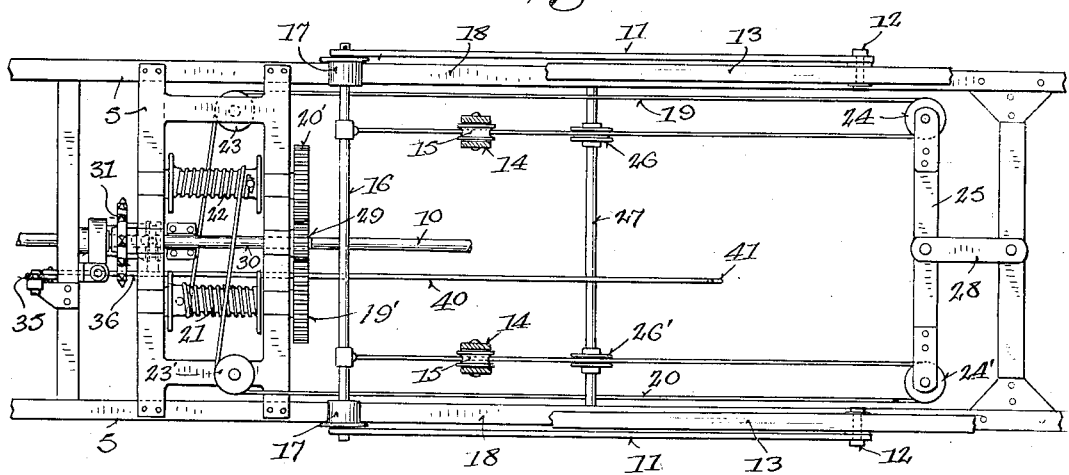
Fig. 2 is a plan view of the frame body, parts being broken away and parts being shown in section.
Figure 3:
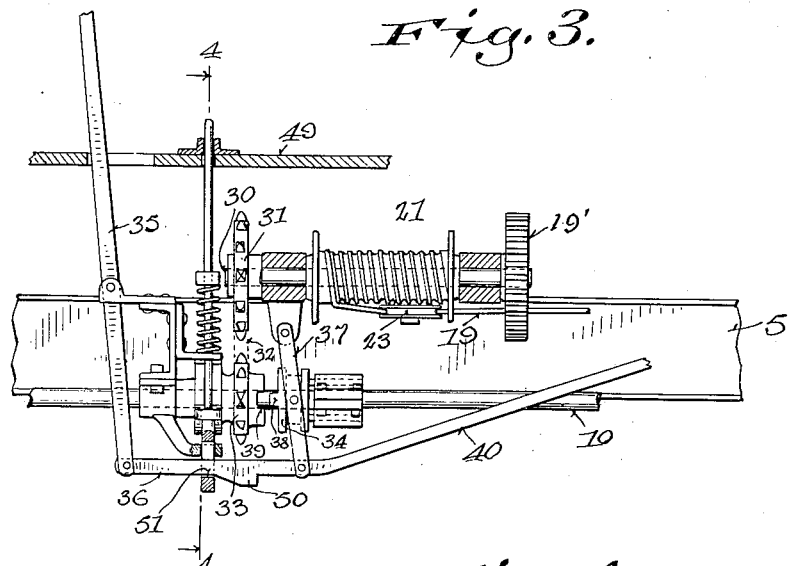
Fig. 3 is a detail sectional view of the operating mechanism, taken on the line 3—3 of Fig. 4.
Figure 4:
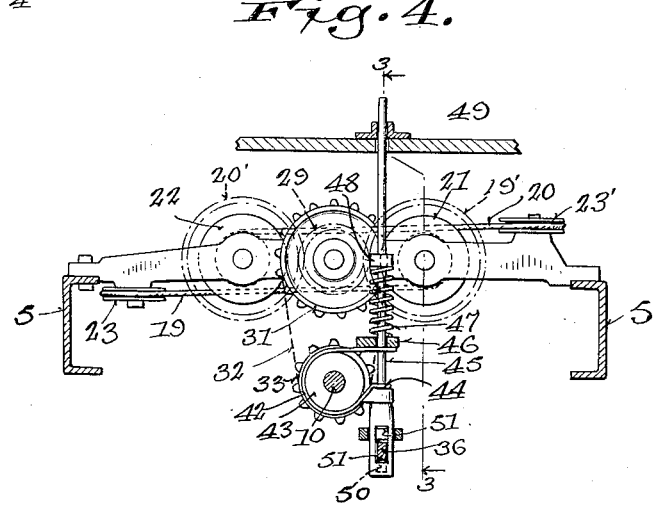
Fig. 4 is a section taken on the line 4—4 of Fig. 3.

Referring to the drawings, the numeral 5 designates the frame of the truck, 6 the driver's cab, 7 the tiltable wagon box pivotally secured at its rear end to brackets 8 on the frame by pins 9, and 10 the drive shaft of the vehicle.

In general the invention consists in a system of levers operated by a cable or cables for raising and lowering the front end of the wagon box, the cables being driven under the operator's control from the drive shaft of the truck.

The leverage system consists of a pair of levers 11 pivotally secured at their rear ends by bolts 12 to the underframing 13 of the box 7 and depending fixed bars 14 carrying pulleys 15. The forward ends of the levers 11 carry a shaft 16 having wheels 17 mounted thereon which run on the track formed by the side bars 18. Cables 19 and 20 are mounted on drums 21 and 22 respectively. Cable 19 passes over a pulley 23 on the frame 5, thence rearwardly and over a pulley 24 on the end of an equalizer bar 25, thence forwardly over a pulley 26 on a shaft 27 carried by the frame 5, thence under normal conditions over one of the pulleys 15 and is secured to the shaft 16. Similarly cable 20 passes over a pulley 23' thence rearwardly and over a pulley 24' on the other end of the bar 25, thence forwardly over a pulley 26' on the shaft 27, thence under normal conditions over the other of the pulleys 15 and is secured to the shaft 16. The equalizer bar 25 is pivotally secured intermediate its ends to a link 28 carried by the frame 5.

With the construction above described when the cables 19 and 20 are wound up on their respective drums the length of the spans of the cables between the shafts 16 and 27 will of course become shorter and shorter with the result that the bars 14 and consequently the front end of the load box 7 will be lifted upwardly as shown in the first dotted line position 7' of the box. Then as the winding of the cables continues the cables will exert a direct pull on the shaft 16 and draw said shaft backwardly toward the rear of the vehicle and thus will cause the levers 11 to exert a leverage against the box and lift the front end higher as shown in the second dotted line position of the box, the rollers or wheels 17 running rearwardly upon the side bars 18 while the levers 11 are being raised.

The drums 21 and 22 are rotated in the same direction through gears 19' and 20' meshing with a gear 29 on a shaft 30 which carries a sprocket wheel 31 connected by a chain 32 to a sprocket wheel 33 on shaft 10 to which it is adapted to be drivingly connected by a sliding tooth clutch 34. The movement of the clutch 34 is controlled by a lever 35, rod 36 and link 37. The lever 35 is pivotally secured intermediate its ends to the truck frame and is pivotally secured at its lower end to the rod 36 which is pivotally secured to one end of the link 37. The other end of the link 37 is pivotally secured to the truck frame and is connected intermediate its ends to the clutch 34 so that a rearward movement of the upper end of the lever 35 will bring the toothed face 38 of the clutch 34 in engagement with the toothed face 39 of the sprocket 33 whereby the rotation of the drive shaft 10 will through the connections previously described rotate the drums 21 and 22 to wind up the cable and thereby raise the wagon box to discharge the load as previously described. To limit the raising movement of the box, the rod 36 has an extension 40 having a hooked end 41 which engages the shaft 16 when said shaft has moved out a predetermined distance and a rearward movement of the shaft 16 under these conditions shifts the rod 36 rearwardly and automatically throws out the clutch.

In returning the wagon to its normal position means are provided for checking its rapid descent comprising a band brake 42 mounted on a brake wheel 43 on the sprocket wheel 33. One end 44 of the brake band is secured to a rod 45 and the other end to a bracket 46 in which said rod 45 is slidably mounted. The band 42 is normally held in engagement with the wheel by means of a spring 47 interposed between the bracket 46 and a collar 48 on the rod, the upper end of the rod passing up through a foot board 49 of the truck adjacent the cab 6.

With this construction the spring 47 normally maintains the rod 45 in its upper position under which conditions the band 42 is drawn up around the wheel 43 as the end 44 is moved upwardly by said rod. When the load is to be discharged the brake is automatically disengaged on the movement of rod 36 by a cam projection 50 on the rod 36 engaging the lower end of a slot 51 in the rod 45 and through which said rod 36 passes. When the box is being lowered and the clutch 34 is thrown out the weight of the wagon box will cause the cables to unwind from the drum and the brake is released or partially released by the operator pressing upon the upper end of the rod 45 with his foot.

While the brake is shown applied to a brake wheel on sprocket 33 it will be understood by those skilled in the art that the brake band can be applied to a brake wheel on the sprocket 31.

What I claim as my invention is:

1. In a vehicle, the combination with a tiltable load receiving box, of a rigid bar fixed to said box and depending therefrom at substantially right angles with respect thereto, a lever having one end pivotally connected with said box medially of its ends, a cable having one end connected with the other end of said lever, the lower free end of said rigid bar engaging a span in said cable whereby a pull on the cable will raise the free end of the box until said span in the cable straightens when a direct pull toward the rear will be exerted on said lever and the raising of the box continued, the free end of said rigid bar being entirely free from said cable when a direct pull is being exerted on said lever, and operating means engaging the other end of said cable.

2. In a vehicle, the combination with a frame and a tiltable load receiving box, of a pair of bars fixedly secured at their upper ends to said box, cable guides carried by said bars at their lower ends, a pair of levers pivotally secured at their rear ends to said box, a shaft joining the front ends of said pivoted levers, wheels mounted on said shaft and running on said frame, cables secured to said wheeled shaft and engageable with the cable guides on said fixed bars, guide means on the frame for said cables, and means for operating said cables.

3. In a vehicle, the combination with its chassis frame, of a load receiving box pivotally secured at its rear end to the frame, a pair of levers pivotally secured at one of their ends to said box medially of its ends and operatively connected together at their free ends, cables secured to the free ends of said levers, guide means on the frame for said cables, a pair of fixed bars fixedly secured at one of their ends to said box near the front end thereof, the other ends of said bars each engaging a span of one of the cables whereby a pull on the cables will raise the front end of said box to a higher position by a direct pull on the free ends of said pivoted levers, means for moving the cables, and controlling means for said cable moving means.

4. In a vehicle, the combination with its chassis frame, of a load receiving box pivotally secured at its rear end to said frame, a lever pivotally secured at one end to said box medially of its ends, a cable operatively connected to the free end of said lever, guide means on the frame for said cable, a fixed bar secured at one end to said box near its front end, a wheel journaled in the other end of said bar and engaging a span of said cable whereby a pull on the cable will first elevate said fixed bar and box and will exert a direct pull on the free end of said pivoted lever when the end of said fixed bar becomes in line with the longitudinal plane of the guide means and the free end of said lever, and means for actuating the cable.

5. In a vehicle, the combination with its chassis frame, of a load receiving box pivotally secured at its rear end to said frame, a lever pivotally secured at one end to said box medially of its ends, a cable operatively connected to the free end of said lever, guide means on the frame for said cable, a fixed bar secured at one end to said box near its front end, a wheel journaled in the other end of said bar and engaging a span of said cable whereby a pull on the cable will first elevate said fixed bar and box and will exert a direct pull on the free end of said pivoted lever when the end of said fixed bar becomes in line with the longitudinal plane of the guide means and the free end of said lever, means for actuating the cable, and means for automatically stopping said actuating means when the box has been raised its limit of movement on its pivot and releasably retaining the box in raised position.

6. In a vehicle, the combination with a tiltable load receiving box, of a pair of bars fixedly secured at their upper ends to said box, cable guides carried by the lower ends of said bars, a pair of levers pivotally secured at their rear ends to said box, a shaft joining the front ends of said pivoted lever together, wheels mounted on said shaft and running on the frame, an equalizer bar provided with cable guides, cables secured to said wheeled shaft, passing over the guides on the equalizer bar and engageable with the cable guides on said fixed bars, and means for operating said cables.

In testimony whereof, I affix my signature.

THEODORE C. HOLLNAGEL.